US012674426B2

(12) United States Patent
Durocher

(10) Patent No.: US 12,674,426 B2
(45) Date of Patent: Jul. 7, 2026

(54) POWERPLANT FUEL SYSTEM UTILIZING AMMONIA

(71) Applicant: Pratt & Whitney Canada Corp., Longueuil (CA)

(72) Inventor: Eric S. Durocher, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/759,149

(22) Filed: Jun. 28, 2024

(65) Prior Publication Data

US 2026/0002477 A1     Jan. 1, 2026

(51) Int. Cl.
  *F02C 9/26*       (2006.01)
  *F02C 3/22*       (2006.01)
  *F02C 9/40*       (2006.01)

(52) U.S. Cl.
  CPC ............... *F02C 9/263* (2013.01); *F02C 3/22* (2013.01); *F02C 9/40* (2013.01)

(58) Field of Classification Search
  CPC .. F02C 9/40; F02C 9/263; F02C 7/232; F02C 7/224; F02C 3/22; F02C 3/36; F02C 6/04; F02C 6/10; F02C 6/18
  See application file for complete search history.

(56) References Cited

U.S. PATENT DOCUMENTS

| | | | | | |
|---|---|---|---|---|---|
| 5,259,186 | A | * | 11/1993 | Snow | F02C 9/26 |
| | | | | | 60/39.281 |
| 11,920,524 | B2 | | 3/2024 | Smith | |

| | | | | |
|---|---|---|---|---|
| 2011/0011354 | A1 | | 1/2011 | Dincer |
| 2021/0332759 | A1 | | 10/2021 | Smith |
| 2022/0154646 | A1 | * | 5/2022 | Araki ..................... C01B 3/047 |
| 2022/0162989 | A1 | | 5/2022 | Cocks |
| 2022/0162999 | A1 | * | 5/2022 | Cocks .................... C01B 3/047 |
| 2022/0325668 | A1 | * | 10/2022 | Wong ........................ F02C 3/22 |
| 2022/0333534 | A1 | * | 10/2022 | Smith ....................... F02C 9/40 |

(Continued)

FOREIGN PATENT DOCUMENTS

| | | |
|---|---|---|
| CN | 107882638 B | 6/2020 |
| CN | 115387914 A | 11/2022 |

(Continued)

OTHER PUBLICATIONS

EP Search Report for EP Patent Application No. 25186317.1 dated Nov. 18, 2025.

*Primary Examiner* — Gerald L Sung
*Assistant Examiner* — Jingchen Liu
(74) *Attorney, Agent, or Firm* — Getz Balich LLC

(57)       ABSTRACT

A fuel system is configured to deliver a first fuel and/or a second fuel to a combustor section. The fuel system includes a first fuel source, a second fuel source, a first control valve, a second control valve, a metering valve and a fuel injector. The first fuel source is configured to crack ammonia into hydrogen gas and nitrogen gas and subsequently output the first fuel. The second fuel source is configured to output the second fuel. The metering valve is configured to meter a flow of the first fuel received from the first fuel source through the first control valve to the fuel injector during a first operating mode. The metering valve is configured to meter a flow of the second fuel received from the second fuel source through the second control valve to the fuel injector during a second operating mode.

17 Claims, 5 Drawing Sheets

(56) References Cited

U.S. PATENT DOCUMENTS

| | | | |
|---|---|---|---|
| 2023/0015930 A1 | 1/2023 | Meshkin Fam | |
| 2023/0243311 A1* | 8/2023 | Brady | F02C 7/224 |
| | | | 60/39.463 |
| 2023/0258135 A1 | 8/2023 | Swann | |
| 2023/0258136 A1 | 8/2023 | Swann | |
| 2023/0258137 A1 | 8/2023 | Swann | |
| 2024/0084741 A1* | 3/2024 | Murray | F02C 9/263 |
| 2024/0102657 A1 | 3/2024 | Kapat | |
| 2024/0167417 A1* | 5/2024 | Lin | F02C 3/22 |

FOREIGN PATENT DOCUMENTS

| | | | | |
|---|---|---|---|---|
| CN | 117365739 A | 1/2024 | | |
| CN | 117404185 A | 1/2024 | | |
| GB | 2279764 A * | 1/1995 | | F02D 19/02 |
| JP | 2024065283 A | 5/2024 | | |
| WO | 2023281265 A1 | 1/2023 | | |

* cited by examiner

POWERPLANT FUEL SYSTEM UTILIZING AMMONIA

TECHNICAL FIELD

This disclosure relates generally to a powerplant and, more particularly, to a fuel system for the powerplant utilizing ammonia.

BACKGROUND INFORMATION

Various fuel systems are known in the art for powerplants such as gas turbine engines, including fuel systems which utilize a non-hydrocarbon fuel such as ammonia. While these known fuel systems have various advantages, there is still room in the art for improvement.

SUMMARY

According to an aspect of the present disclosure, a powerplant is provided that includes a turbine engine and a fuel system. The turbine engine includes a flowpath, a compressor section, a combustor section and a turbine section. The flowpath extends through the compressor section, the combustor section and the turbine section from an inlet into the flowpath to an exhaust from the flowpath. The fuel system is configured to deliver at least one of a first fuel or a second fuel to the combustor section. The fuel system includes a first fuel source, a second fuel source, a first control valve, a second control valve, a metering valve and a fuel injector disposed within the combustor section. The first fuel source is configured to crack ammonia into hydrogen gas and nitrogen gas and subsequently output the first fuel. The first fuel is or otherwise includes the hydrogen gas or a combination of the hydrogen gas and the nitrogen gas. The second fuel source is configured to output the second fuel. The second fuel is or otherwise includes additional hydrogen gas. The metering valve is configured to meter a flow of the first fuel received from the first fuel source through the first control valve to the fuel injector during a first operating mode. The metering valve is configured to meter a flow of the second fuel received from the second fuel source through the second control valve to the fuel injector during a second operating mode.

According to another aspect of the present disclosure, another powerplant is provided that includes an aircraft engine and a fuel system. The fuel system is configured to deliver at least one of a first fuel or a second fuel to the aircraft engine for combustion. The fuel system includes a first fuel source, a second fuel source, a first control valve, a second control valve and a metering valve. The first fuel source is configured to crack ammonia into hydrogen gas and nitrogen gas. The first fuel source is configured to output the hydrogen gas or a combination of the hydrogen gas and the nitrogen gas as the first fuel. The second fuel source is configured to output additional hydrogen gas as the second fuel. The metering valve is configured to meter a flow of the first fuel received from the first fuel source through the first control valve directed into the aircraft engine during a first operating mode. The metering valve is configured to meter a flow of the second fuel received from the second fuel source through the second control valve directed into the aircraft engine during a second operating mode.

According to still another aspect of the present disclosure, another powerplant is provided that includes an aircraft engine and a fuel system. The fuel system is configured to deliver at least one of a first fuel or a second fuel to the aircraft engine for combustion. The fuel system includes a first fuel source, a second fuel source, a metering valve and a compressor. The first fuel source is configured to crack ammonia into hydrogen gas and nitrogen gas. The first fuel source is configured to output the hydrogen gas or a combination of the hydrogen gas and the nitrogen gas as the first fuel. The second fuel source is configured to output additional hydrogen gas as the second fuel. The metering valve is configured to meter a flow of the first fuel received from the first fuel source directed into the aircraft engine during a first operating mode. The metering valve is configured to meter a flow of the second fuel received from the second fuel source directed into the aircraft engine during a second operating mode. The compressor is configured to at least one of compress the first fuel during the first operating mode or compress the second fuel during the second operating mode. An inlet into the compressor is fluidly coupled to the metering valve downstream of the metering valve. An outlet from the compressor is fluidly coupled to the metering valve upstream of the metering valve.

The aircraft engine may be operating in a steady-state during the first operating mode. The aircraft engine may be starting up in during the second operating mode.

The first control valve may be configured to fluidly couple the first fuel source to the metering valve during the first operating mode. The first control valve may be configured to fluidly decouple the first fuel source from the metering valve during the second operating mode.

The second control valve may be configured to fluidly couple the second fuel source to the metering valve during the second operating mode. The second control valve may be configured to fluidly decouple the second fuel source from the metering valve during the first operating mode.

The first fuel source may be fluidly decoupled from the second fuel source upstream of the metering valve.

The second fuel source may be configured as a second fuel tank.

The first fuel source may also be configured to output the second fuel for filling the second fuel tank with the second fuel during the first operating mode or a third operating mode.

The first fuel source may also be configured to receive heat energy generated by operation of the turbine engine and heat the ammonia using the heat energy to activate a cracking cycle of the ammonia into the hydrogen gas and the nitrogen gas.

The first operating mode may correspond to post-startup operation of the turbine engine.

The second operating mode may correspond to initial startup of the turbine engine.

The first fuel may be/only include the hydrogen gas.

The first fuel may be/only include the combination of the hydrogen gas and the nitrogen gas.

The second fuel may be/only include the additional hydrogen gas.

The fuel system may include a compressor configured to at least one of compress the first fuel during the first operating mode or compress the second fuel during the second operating mode.

An inlet into the compressor may be fluidly coupled to the metering valve downstream of the metering valve. An outlet from the compressor may be fluidly coupled to the metering valve upstream of the metering valve.

The fuel system may also include a shutoff valve fluidly coupled inline between the metering valve and the fuel injector.

The powerplant may also include a purge system configured to purge the first fuel and/or the second fuel out of the fuel system downstream of the shutoff valve.

The fuel system may also include a flowmeter fluidly coupled inline between the metering valve and the shutoff valve.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
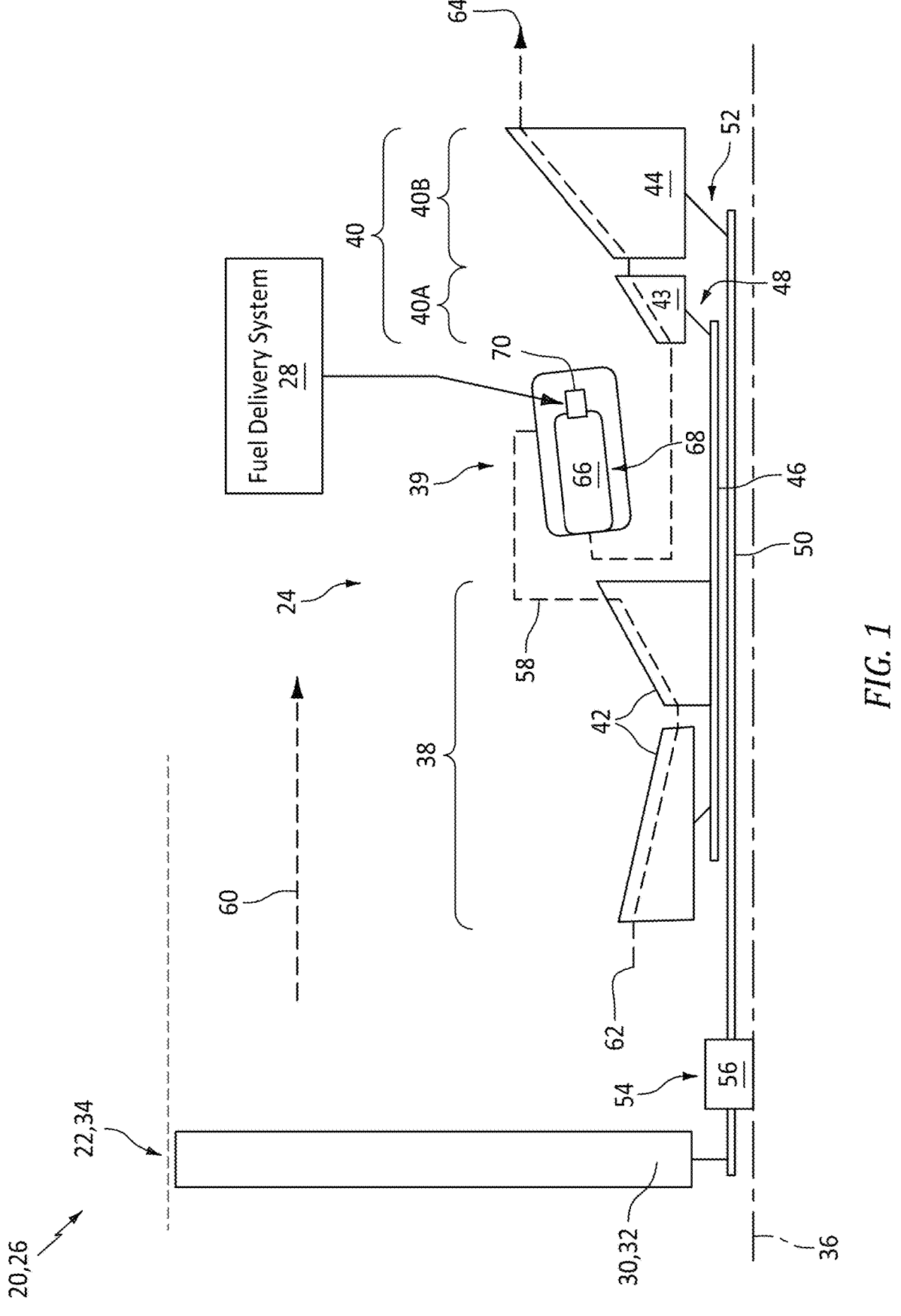
FIG. 1 is a partial schematic illustration of a powerplant for an aircraft.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The powerplant 20 may be configured as, or otherwise included as part of, a propulsion system for the aircraft. The powerplant 20 may also or alternatively be configured as, or otherwise included as part of, an electrical power system for the aircraft. The present disclosure, however, is not limited to aircraft applications. The powerplant 20, for example, may alternatively be configured as, or otherwise included as part of, an electrical power system for ground-based operation (e.g., an industrial powerplant), for aquatic operation, or otherwise. However, for ease of description, the powerplant 20 is described below as an aircraft powerplant.

The aircraft powerplant 20 of FIG. 1 includes a mechanical load 22 and a core 24 of a gas turbine engine 26, where the engine core 24 is configured to power operation of the mechanical load 22. The aircraft powerplant 20 also includes a fuel system 28 for the turbine engine 26 and its engine core 24.

The mechanical load 22 may be configured as or otherwise include a rotor 30 mechanically driven by the engine core 24. This driven rotor 30 may be a bladed propulsor rotor for the aircraft propulsion system. The propulsor rotor may be a ducted propulsor rotor or an open propulsor rotor; e.g., an un-ducted propulsor rotor. For example, where the turbine engine 26 is a turbofan engine, the ducted propulsor rotor may be a fan rotor 32. Where the turbine engine 26 is a turboprop engine, the open propulsor rotor may be a propeller rotor. Where the turbine engine 26 is a turboshaft engine, the open propulsor rotor may be a rotorcraft rotor such as a helicopter main rotor or a helicopter tail rotor. Alternatively, the driven rotor 30 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary turbine engines. The turbine engine 26, for example, may alternatively be configured as a turbojet engine, a propfan engine, a pusher fan engine or any other type of turbine engine operable to power the operation of the mechanical load 22. However, for ease of description, the mechanical load 22 is described below as a fan section 34 of the turbine engine 26, and the driven rotor 30 is described below as the fan rotor 32 within the fan section 34.

The turbine engine 26 extends axially along an axis 36 from a forward, upstream end of the turbine engine 26 to an aft, downstream end of the turbine engine 26. Briefly, this axis 36 may be a centerline axis of the turbine engine 26 and its members. The axis 36 may also be a rotational axis of one or more members of the turbine engine 26 and its engine core 24 including the fan rotor 32—the driven rotor 30. The turbine engine 26 of FIG. 1 includes the fan section 34, a compressor section 38, a combustor section 39 and a turbine section 40. The turbine section 40 of FIG. 1 includes a high pressure turbine (HPT) section 40A and a low pressure turbine (LPT) section 40B, which LPT section 40B of FIG. 1 is a power turbine (PT) section for driving rotation of the fan rotor 32.

The compressor section 38 includes a compressor rotor 42. The HPT section 40A includes a high pressure turbine (HPT) rotor 43. The LPT section 40B includes a low pressure turbine (LPT) rotor 44. The fan rotor 32, the compressor rotor 42, the HPT rotor 43 and the LPT rotor 44 each respectively include one or more arrays (e.g., stages) of rotor blades, where the rotor blades in each array are arranged circumferentially around and are connected to a respective rotor disk or hub. The rotor blades in each array, for example, may be formed integral with or mechanically fastened, welded, brazed and/or otherwise attached to the respective rotor disk and/or hub.

The compressor rotor 42 is coupled to and rotatable with the HPT rotor 43. The compressor rotor 42 of FIG. 1, for example, is connected to the HPT rotor 43 by a high speed shaft 46. At least (or only) the compressor rotor 42, the HPT rotor 43 and the high speed shaft 46 collectively form a high speed rotating assembly 48; e.g., a high speed spool of the engine core 24.

The LPT rotor 44 of FIG. 1 is connected to a low speed shaft 50. At least (or only) the LPT rotor 44 and the low speed shaft 50 collectively form a low speed rotating assembly 52; e.g., a low speed spool/a power turbine spool of the engine core 24. This low speed rotating assembly 52 is further coupled to the fan rotor 32—the driven rotor 30—through a drivetrain 54. This drivetrain 54 may be configured as a geared drivetrain, where a geartrain 56 (e.g., a transmission, a speed change device, an epicyclic geartrain, etc.) is disposed between and operatively couples the fan rotor 32 to the low speed rotating assembly 52 and its LPT rotor 44. With this arrangement, the fan rotor 32 may rotate at a different (e.g., slower) rotational velocity than the low speed rotating assembly 52 and its LPT rotor 44. However, the drivetrain 54 may alternatively be configured as a direct drive drivetrain, where the geartrain 56 is omitted. With such an arrangement, the fan rotor 32 rotates at a common (the same) rotational velocity as the low speed rotating assembly 52 and its LPT rotor 44. Referring again to FIG. 1, each of the rotating assemblies 48, 52 and its members as well as the fan rotor 32 may be rotatable about the axis 36.

The turbine engine 26 of FIG. 1 includes a (e.g., annular) core flowpath 58 and a (e.g., annular) bypass flowpath 60. Here, the bypass flowpath 60 is a ducted flowpath within the aircraft powerplant 20 and its turbine engine 26. The bypass flowpath 60, however, may alternatively be an open flowpath where the driven rotor 30 is alternatively configured as the open propulsor rotor, or the bypass flowpath 60 may be omitted where the driven rotor 30 is alternatively configured as the generator rotor. Referring again to FIG. 1, the core flowpath 58 extends within the turbine engine 26 and its engine core 24 from an airflow inlet 62 into the core flowpath 58 to a combustion products exhaust 64 from the core flowpath 58. More particularly, the core flowpath 58 extends from the core inlet 62, sequentially through the compressor section 38, the combustor section 39, the HPT section 40A and the LPT section 40B, to the core exhaust 64. The bypass flowpath 60 of FIG. 1 extends outside of the engine core 24 thereby bypassing the engine core 24 and its engine sections 38-40B.

During operation of the turbine engine 26, air is directed across the fan rotor 32 (e.g., the propulsor rotor) and into the engine core 24 through the core inlet 62. This air entering the core flowpath 58 may be referred to as core air. The core air is compressed by the compressor rotor 42 and directed into a combustion chamber 66 (e.g., an annular combustion chamber) within a combustor 68 (e.g., an annular combustor) of the combustor section 39. Fuel is injected into the combustion chamber 66 by one or more fuel injectors 70 and mixed with the compressed core air to provide a fuel-air mixture. This fuel-air mixture is ignited and combustion products thereof flow through and sequentially drive rotation of the HPT rotor 43 and the LPT rotor 44. The rotation of the HPT rotor 43 drives rotation of the compressor rotor 42 and, thus, the compression of the air received from the core inlet 62. The rotation of the LPT rotor 44 drives rotation of the fan rotor 32—the driven rotor 30. The rotation of the fan rotor 32 propels some of the air flow thereacross (e.g., the air not entering the engine core 24) through the bypass flowpath 60 to provide engine thrust. Of course, where the driven rotor 30 is alternatively configured as the open propulsor rotor, the rotation of this open propulsor rotor may propel air outside of the aircraft powerplant 20 and its turbine engine 26. Where the driven rotor 30 is alternatively configured as the generator rotor, the rotation of this generator rotor may facilitate generation of electricity.

Figure 2:
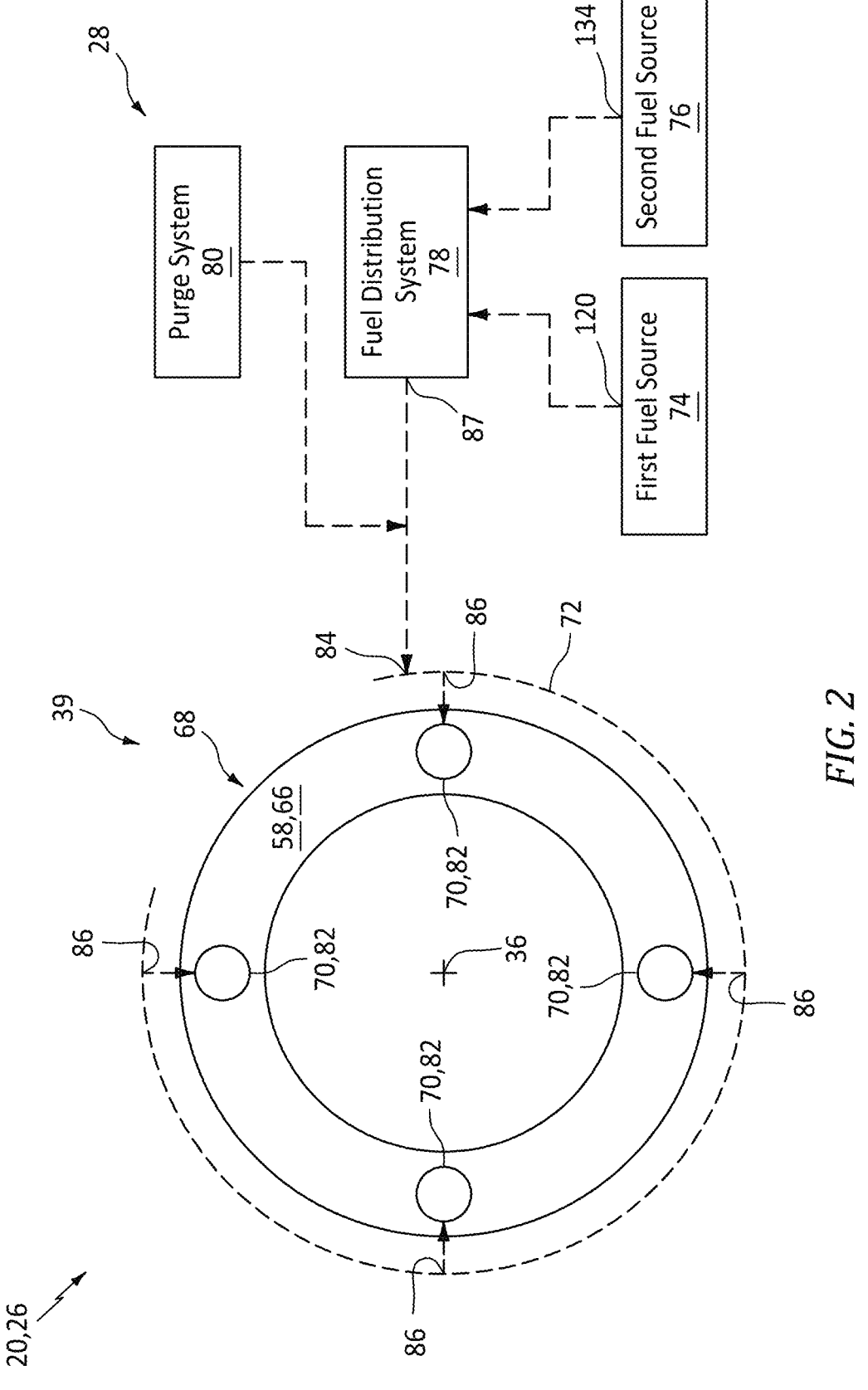
FIG. 2 is a partial schematic illustration of a fuel system with a turbine engine combustor.

Referring to FIG. 2, the fuel system 28 is configured to deliver the fuel to the combustor 68 for combustion. The fuel system 28 of FIG. 2, for example, includes the one or more fuel injectors 70, a fuel manifold 72, a first fuel source 74, a second fuel source 76 and a fuel distribution system 78. This fuel system 28 may also include a purge system 80.

The fuel injectors 70 of FIG. 2 are arranged and may be equispaced circumferentially about the axis 36 in an annular array; e.g., a circular array. Each of these fuel injectors 70 is configured to inject the fuel into the combustion chamber 66. Each of the fuel injectors 70, for example, may include a fuel nozzle 82 which projects partially into the combustion chamber 66 to a tip of the fuel nozzle 82. Alternatively, the fuel nozzle 82 and its nozzle tip may be arranged upstream of the combustion chamber 66, but in fluid communication with the combustion chamber 66 through, for example, a bore of an air swirler assembly or the like.

The fuel manifold 72 of FIG. 2 extends circumferentially about (e.g., partially or completely around) the axis 36. This fuel manifold 72 fluidly couples the fuel distribution system 78 to the fuel injectors 70. The fuel manifold 72 of FIG. 2, for example, includes an inlet 84 into the fuel manifold 72 and one or more outlets 86 from the fuel manifold 72 (here, one manifold outlet for each fuel injector 70). The manifold inlet 84 is downstream of and fluidly coupled with an outlet 87 from the fuel distribution system 78. Each manifold outlet 86 is upstream of and is fluidly coupled to an inlet of a respective one of the fuel injectors 70.

Figure 3:
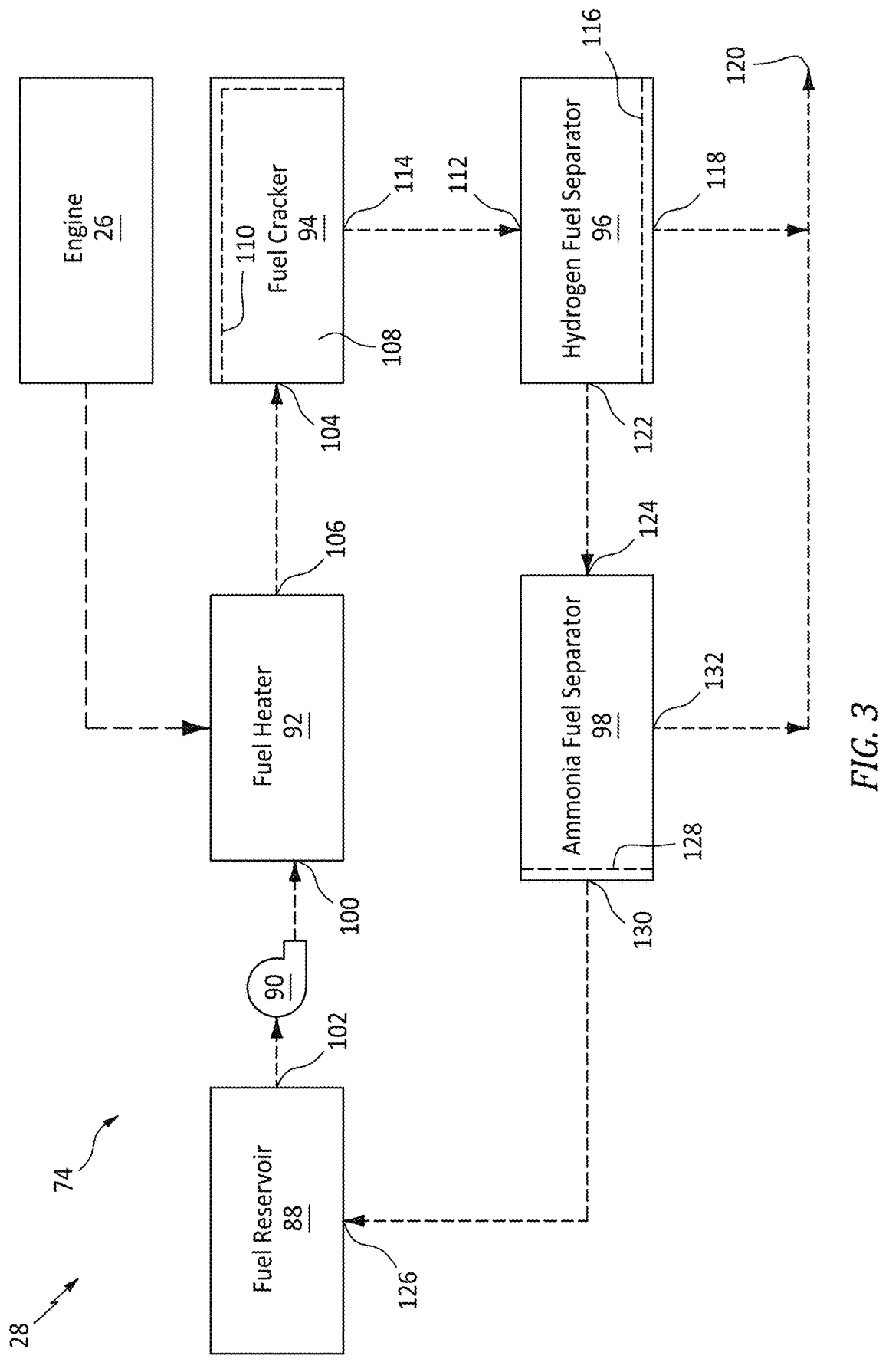
FIG. 3 is a schematic illustration of a first fuel source.

Referring to FIG. 3, the first fuel source 74 is configured to output a flow of a first fuel to the fuel distribution system 78. This first fuel output by the first fuel source 74 is a non-hydrocarbon fuel, and may be substantially or completely in a gaseous phase. The first fuel output from the first fuel source 74 may thereby be a gaseous non-hydrocarbon fuel. The first fuel, for example, may be/(e.g., substantially or only) include hydrogen gas; e.g., $H_2$ gas. Alternatively, the first fuel may include the hydrogen gas along with nitrogen gas; e.g., a mixture of $H_2$ gas and $N_2$ gas. The first fuel source 74 of FIG. 3 includes a fuel reservoir 88, a fuel pump 90, a fuel heater 92, a fuel cracker 94 and one or more fuel separators 96 and 98.

The fuel reservoir 88 may be configured as or otherwise includes a container such as, but not limited to, a tank, a cylinder, a pressure vessel or a bladder. This fuel reservoir 88 is configured to contain, hold and store a quantity of ammonia ($NH_3$). The ammonia stored within the fuel reservoir 88 may be substantially or completely in a liquid phase; e.g., liquid ammonia.

An inlet 100 into the fuel heater 92 is downstream from and is fluidly coupled to an outlet 102 from the fuel reservoir 88 through the fuel pump 90. This fuel heater 92 is configured to heat the liquid ammonia output from the fuel reservoir 88 partially or completely into a gaseous phase. The fuel heater 92, for example, may vaporize some or all of the liquid ammonia received from the fuel reservoir 88 via the fuel pump 90 into gaseous ammonia; e.g., $NH_3$ gas.

The fuel heater 92 may be configured as a heat exchanger which receives heat energy generated by the turbine engine 26 during operation thereof, and transfers some or all of that heat energy into the ammonia. The heat exchanger, for example, may receive a working fluid from the turbine engine 26 of FIG. 1. This working fluid may be compressed core air bled from the core flowpath 58 along or downstream of the compressor section 38. Alternatively, the working fluid may be combustion products bled from the core flowpath 58 along or downstream of the combustor 68 and, more particularly, along or downstream of the turbine section 40. Alternatively, the working fluid may be a fluid used for cooling one or more components of the turbine engine 26 following the cooling of the respective engine component (s); e.g., now heated cooling air, heated lubricant, heated fuel, etc. Still alternatively, the working fluid may be an intermediate fluid which draws heat energy out of one or more components of the turbine engine 26 during cooling and/or lubricating the respective engine component(s); e.g., lubricant, coolant, heat transfer fluid, etc. The present disclosure, however, is not limited to such exemplary working fluids nor to such exemplary heat sources for generating the heat energy within the turbine engine 26. Moreover, while the fuel heater 92 of FIG. 3 is generally described herein as a fluid-to-fluid heat exchanger—a working fluid-to-ammonia heat exchanger—the present disclosure is not limited to such an exemplary fuel heater configuration. The fuel heater 92, for example, may alternatively be configured as (or also include) an electric heater or any other type of heater capable of raising a temperature of (e.g., and vaporizing) the ammonia. Moreover, while the first fuel source 74 of FIG. 3 is shown with a single fuel heater 92, it is contemplated the fuel heater 92 may be one or multiple fuel heaters fluidly coupled between the fuel reservoir 88 and the fuel cracker 94 (or with the fuel cracker 94).

An inlet 104 into the fuel cracker 94 is downstream from and is fluidly coupled to an outlet 106 from the fuel heater 92. This fuel cracker 94 is configured to facilitate at least partial or complete cracking (e.g., decomposition) of the ammonia (e.g., the gaseous ammonia) received from the fuel heater 92 into the hydrogen gas and the nitrogen gas. A passage 108 through the fuel cracker 94, for example, may be at least partially or completely lined, coated and/or otherwise formed by at least one catalyst 110. The passage 108 may also or alternatively be partially filled with a porous catalyst-containing material such as pellets or honeycomb. Examples of the catalyst 110 include, but are not limited to, nickel (Ni), iron (Fe), ruthenium (Ru), platinum (Pt) or an alloy including any one or more of the foregoing metals. The ammonia gas may thereby flow along, contact and interact with the catalyst 110 as it flows in the fuel cracker 94 and its passage 108, where the interaction between the ammonia gas and the catalyst facilitates at least partial or complete cracking of the ammonia gas into the hydrogen gas and the nitrogen gas. While the fuel cracker 94 is shown in FIG. 3 as a separate element from the fuel heater 92, it is contemplated the fuel heater 92 and the fuel cracker 94 may alternatively be combined into a single device. Alternatively, it is contemplated the fuel cracker 94 may also be a heater configured to further heat the ammonia during the cracking process.

An inlet 112 into the hydrogen fuel separator 96 is downstream from and is fluidly coupled to an outlet 114 from the fuel cracker 94 (or an outlet from a combination fuel heater/fuel cracker). This hydrogen fuel separator 96 is configured to separate the at least partially (or completely) cracked ammonia into two or more groupings. For example, following the partial cracking of the ammonia via the fuel cracker 94, the hydrogen fuel separator 96 may receive the (remaining/uncracked) ammonia gas, the hydrogen gas and the nitrogen gas. The hydrogen fuel separator 96 may separate these components into two groupings. The first grouping may be/(e.g., substantially or only) include the hydrogen gas. The second grouping may be/(e.g., substantially or only) include a mixture of the (remaining/uncracked) ammonia gas and the nitrogen gas. However, it is contemplated the first grouping may alternatively further include the nitrogen gas, and the second grouping may be (e.g., substantially or only) the remaining uncracked ammonia gas.

To separate the at least partially (or completely) cracked ammonia into the first and the second groupings, the hydrogen fuel separator 96 may include a hydrogen permeable membrane 116. This hydrogen permeable membrane 116 is configured to separate at least some of the first group (e.g., the hydrogen gas) from the second group (e.g., the nitrogen gas and any remaining ammonia gas). The hydrogen permeable membrane 116 may be constructed from or otherwise include one or more Group V metals such as palladium (Pd), alloys of palladium with other metals such as silver (Ag) or copper (Cu), or one or more other materials with high permeability of hydrogen gas as compared to ammonia gas and nitrogen gas.

A first outlet 118 from the hydrogen fuel separator 96 is upstream of and is fluidly coupled to an outlet 120 from the first fuel source 74. This first outlet 118 from the hydrogen fuel separator 96 directs the separated hydrogen gas to the outlet 120 from the first fuel source 74. A second outlet 122 from the hydrogen fuel separator 96 is upstream of and fluidly coupled to an inlet 124 into the ammonia fuel separator 98. This second outlet 122 from the hydrogen fuel separator 96 directs the remaining nitrogen gas and/or ammonia gas to the inlet 124 of the ammonia fuel separator 98. Alternatively, it is contemplated the first outlet 118 from the hydrogen fuel separator 96 may be the outlet 120 from the first fuel source 74 where, for example, the ammonia fuel separator 98 is omitted or alternatively configured within the first fuel source 74. In such embodiments, the second outlet 122 from the hydrogen fuel separator 96 may alternatively be upstream or and fluidly coupled to a return 126 (e.g., an inlet) into the fuel reservoir 88.

The ammonia fuel separator 98 is configured to separate any remaining ammonia gas from the nitrogen gas. The ammonia fuel separator 98, for example, may include an ammonia permeable membrane 128. This ammonia permeable membrane 128 is configured to separate at least some of the remaining ammonia gas from the nitrogen gas. The ammonia permeable membrane 128 may be formed from one or more polymers, zeolites, or other materials with high permeability of ammonia gas as compared to hydrogen gas or nitrogen gas.

A first outlet 130 from the ammonia fuel separator 98 is upstream of and is fluidly coupled to the return 126 of the fuel reservoir 88. This first outlet 130 from the ammonia fuel separator 98 directs the separated ammonia gas back to the fuel reservoir 88 for storage and then reuse. A second outlet 132 from the ammonia fuel separator 98 is upstream of and is fluidly coupled to the outlet 120 from the first fuel source 74. The outlet 120 from the first fuel source 74 may thereby be configured to output a combination of the hydrogen gas and the nitrogen gas from the first fuel source 74. Alternatively, it is contemplated the nitrogen gas may be routed elsewhere for storage and/or alternative use.

Figure 4:
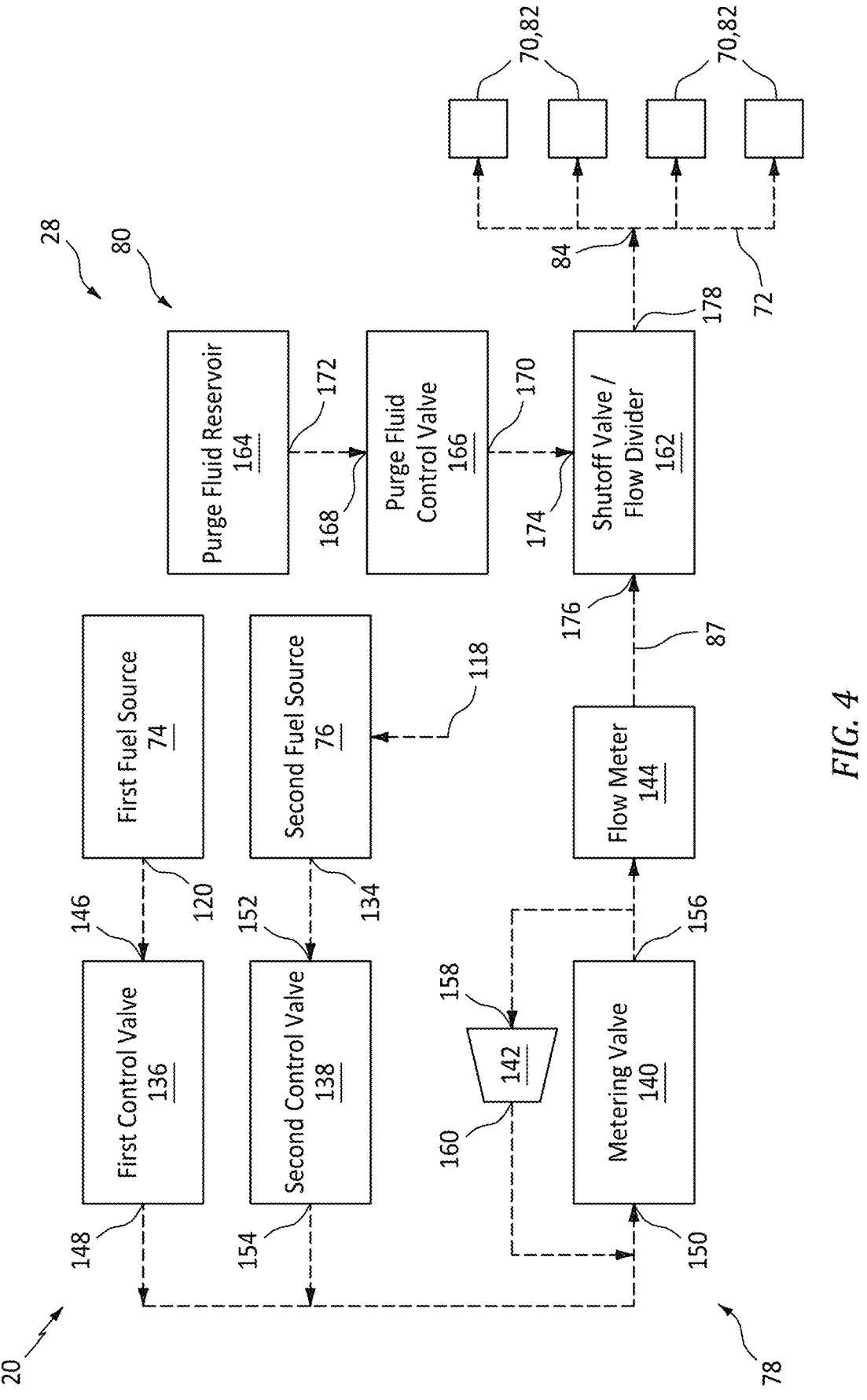
FIG. 4 is a schematic illustration of the fuel system.

Referring to FIG. 4, the second fuel source 76 may be configured as or otherwise include a container such as, but not limited to, a tank, a cylinder, a pressure vessel or a bladder. The second fuel source 76 of FIG. 4, for example, is configured as a standalone auxiliary hydrogen reservoir. This second fuel source 76 is configured to contain, hold and store a quantity of additional (e.g., pure) hydrogen; e.g., $H_2$. The hydrogen stored within the second fuel source 76 may be substantially or completely in a gaseous phase; e.g., hydrogen gas. However, in other embodiments, it is contemplated the hydrogen may be stored within the second fuel source 76 as liquid hydrogen where additional equipment is included to facilitate vaporization of the liquid hydrogen into the hydrogen gas. The second fuel source 76 of FIG. 4 is thereby configured to output the additional hydrogen gas from its outlet 134.

The hydrogen stored within the second fuel source 76 may be received from an outside hydrogen source; e.g., a source outside of the aircraft. The second fuel source 76 may thereby be fluidly decoupled from the first fuel source 74 upstream of the fuel distribution system 78. Alternatively, it is contemplated the second fuel source 76 may be partially filled (e.g., recharged) by some of the hydrogen gas output from the first outlet 118 of the hydrogen fuel separator 96.

The fuel distribution system 78 is configured to selectively fluidly couple the first fuel source 74 and/or the second fuel source 76 to the fuel manifold 72 and, thus, the fuel injectors 70. The fuel distribution system 78 of FIG. 4, for example, includes a first control valve 136, a second control valve 138 and a metering valve 140. This fuel distribution system 78 may also include a compressor 142 and/or a flowmeter 144.

The first control valve 136 is fluidly coupled (e.g., serially) inline between the first fuel source 74 and the metering valve 140. The first control valve 136 of FIG. 4, for example, includes an inlet 146 into the first control valve 136 and an outlet 148 from the first control valve 136. The inlet 146 of the first control valve 136 is downstream from and is fluidly coupled with the outlet 120 from the first fuel source 74. The outlet 148 of the first control valve 136 is upstream of and is fluidly coupled with an inlet 150 into the metering valve 140.

The first control valve 136 may be configurable in a (e.g., fully) open position and a (e.g., fully) closed position. In the open position, the hydrogen gas and the nitrogen gas (or the pure hydrogen gas) may flow from the first fuel source 74 to the metering valve 140 unimpeded. In the closed position, the first control valve 136 may prevent any flow of the hydrogen gas and the nitrogen gas (or the pure hydrogen gas) from the first fuel source 74 to the metering valve 140. Here, the first control valve 136 is configured as an on-or-off/open-or-closed type of valve. It is contemplated, however, the first control valve 136 may alternatively be configured to operate in one or more intermediate (e.g., partially) open positions so as to permit a limited flow of the hydrogen gas and the nitrogen gas (or the pure hydrogen gas) from the first fuel source 74 to the metering valve 140.

The second control valve 138 is fluidly coupled (e.g., serially) inline between the second fuel source 76 and the metering valve 140. The second control valve 138 of FIG. 4, for example, includes an inlet 152 into the second control valve 138 and an outlet 154 from the second control valve 138. The inlet 152 of the second control valve 138 is downstream from and is fluidly coupled with the outlet 134 from the second fuel source 76. The outlet 154 of the second control valve 138 is upstream of and is fluidly coupled with the inlet 150 into the metering valve 140.

The second control valve 138 may be configurable in a (e.g., fully) open position and a (e.g., fully) closed position. In the open position, the hydrogen gas may flow from the second fuel source 76 to the metering valve 140 unimpeded. In the closed position, the second control valve 138 may prevent any flow of the hydrogen gas from the second fuel source 76 to the metering valve 140. Here, the second control valve 138 is configured as an on-or-off/open-or-closed type of valve. It is contemplated, however, the second control valve 138 may alternatively be configured to operate in one or more intermediate (e.g., partially) open positions so as to permit a limited flow of the hydrogen gas from the second fuel source 76 to the metering valve 140.

The metering valve 140 is fluidly coupled inline between (a) the first control valve 136 and the second control valve 138 and (b) the fuel manifold 72. The inlet 150 of the metering valve 140 of FIG. 4, in particular, is fluidly coupled in parallel with the outlet 148 from the first control valve 136 and the outlet 154 from the second control valve 138. An outlet 156 from the metering valve 140 is fluidly coupled to the outlet 87 of the fuel distribution system 78 and the manifold inlet 84.

The metering valve 140 is configured to meter (e.g., regulate) the flow of the hydrogen gas and the nitrogen gas from the first fuel source 74 and/or the hydrogen gas from the second fuel source 76 (generally referred to as "fuel") thereacross to the fuel manifold 72 and, thus, the fuel injectors 70. The metering valve 140, for example, may fully open to permit the fuel to flow therethrough unimpeded. The metering valve 140 may partially open to permit a limited flow the fuel therethrough. The metering valve 140 may also close to reduce fuel flow therethrough to a minimum (but, non-zero) level. Here, even in its closed position, the metering valve 140 may continue to fluidly couple the first fuel source 74 and/or the second fuel source 76 to the fuel manifold 72, albeit with a minimum flowrate.

Figure 5:
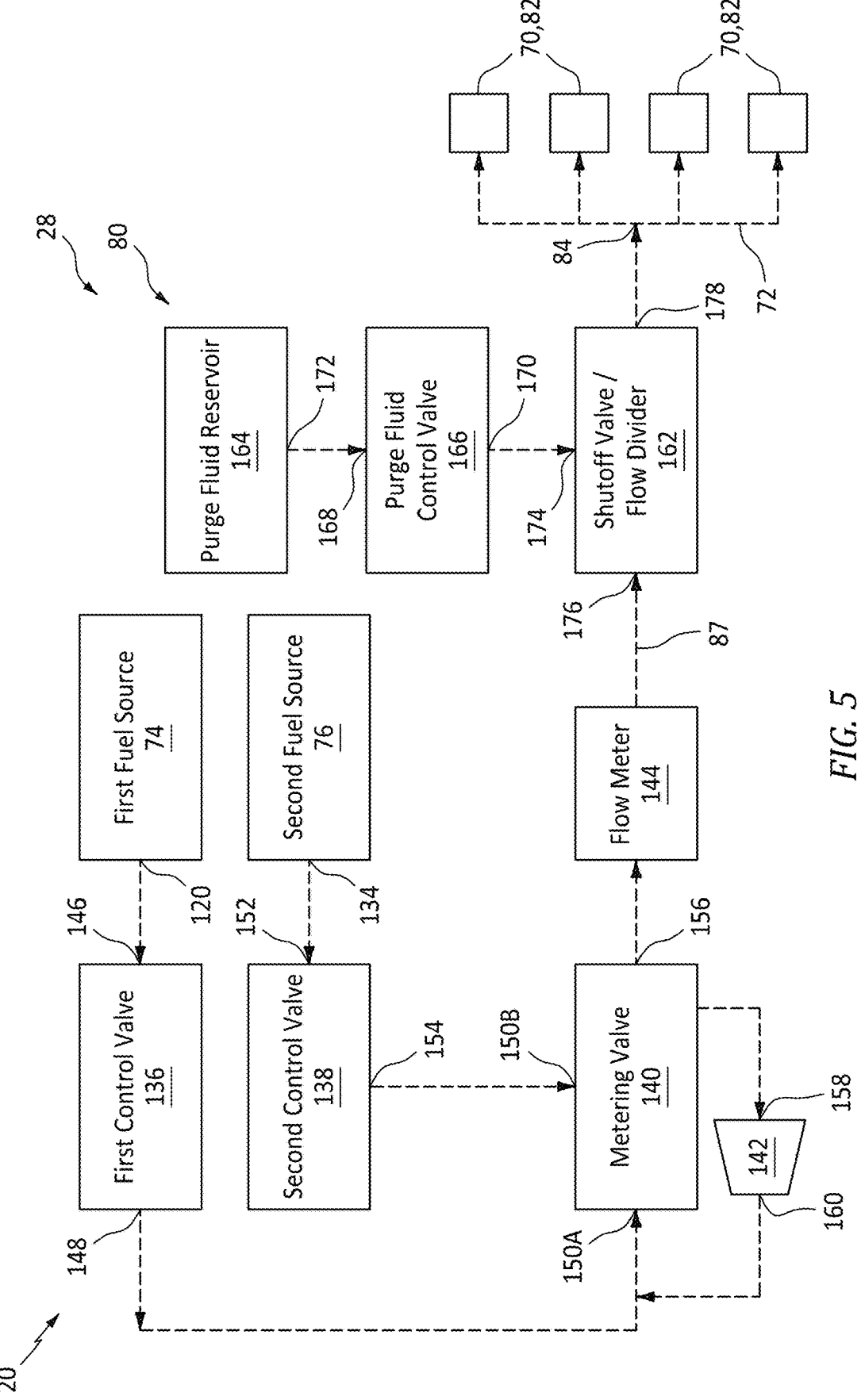
FIG. 5 is a schematic illustration of the fuel system with another metering valve arrangement.

While the metering valve 140 is shown in FIG. 4 with a single inlet 150 fluidly coupled in parallel to the first control valve 136 and the second control valve 138, the present disclosure is not limited thereto. For example, referring to FIG. 5, the metering valve 140 may alternatively further be configured as a mixing valve with multiple inlets 150A and 150B. Here, the first inlet 150A into the metering valve 140 is fluidly coupled to the outlet 148 from the first control valve 136. The second inlet 150B into the metering valve 140 is fluidly coupled to the outlet 154 from the second control valve 138.

Referring to FIG. 4, the compressor 142 is configured to increase a pressure of the fuel flowing through the metering valve 140/to the outlet 87. An inlet 158 into the compressor 142 of FIG. 4, for example, is fluidly coupled with the metering valve 140, downstream of the outlet 156 from the metering valve 140. An outlet 160 from the compressor 142 is fluidly coupled with the metering valve 140, upstream of the inlet 150 into the metering valve 140. Here, the compressor 142 may be controlled based on, for example, flow data output by the flowmeter 144. Briefly, the flowmeter 144 of FIG. 4 is arranged downstream of the metering valve 140 and the compressor 142, and upstream of the outlet 87 from the fuel distribution system 78.

The purge system 80 is configured to purge the fuel out of the fuel system 28 downstream of a shutoff valve 162. The purge system 80 of FIG. 4 includes a purge fluid reservoir 164, a purge fluid control valve 166 and the shutoff valve 162.

The purge fluid reservoir 164 may be configured as or otherwise include a container such as, but not limited to, a tank, a cylinder, a pressure vessel or a bladder. This purge fluid reservoir 164 is configured to contain, hold and store a quantity of a purge fluid; e.g., an inert gas.

The purge fluid control valve 166 is fluidly coupled (e.g., serially) inline between the purge fluid reservoir 164 and the shutoff valve 162. The purge fluid control valve 166 of FIG. 4, for example, includes an inlet 168 into the purge fluid control valve 166 and an outlet 170 from the purge fluid control valve 166. The inlet 168 of the purge fluid control valve 166 is downstream from and is fluidly coupled with an outlet 172 from the purge fluid reservoir 164. The outlet 170 of the purge fluid control valve 166 is upstream of and is fluidly coupled with a first inlet 174 into the metering valve 140.

The purge fluid control valve 166 may be configurable in a (e.g., fully) open position and a (e.g., fully) closed position. In the open position, the purge fluid may flow from the purge fluid reservoir 164 to the shutoff valve 162 unimpeded. In the closed position, the purge fluid control valve 166 may prevent any flow of the purge fluid from the purge fluid reservoir 164 to the shutoff valve 162. Here, the purge fluid control valve 166 is configured as an on-or-off/open-or-closed type of valve.

The shutoff valve 162 is fluidly coupled inline between (a) the metering valve 140 and the purge fluid control valve 166 and (b) the fuel manifold 72. The first inlet 174 of the shutoff valve 162 of FIG. 4, in particular, is downstream of and is fluidly coupled to the outlet 170 from the purge fluid control valve 166. A second inlet 176 into the shutoff valve 162 is downstream of and is fluidly coupled to the outlet 156 from the metering valve 140 and the outlet 87 of the fuel distribution system 78. An outlet 178 from the shutoff valve 162 is upstream of and is fluidly coupled to the manifold inlet 84.

The shutoff valve 162 may be configurable in a (e.g., fully) open position and a (e.g., fully) closed position. In the open position, the fuel may flow from the metering valve 140 to the fuel manifold 72 unimpeded. In the closed position, the shutoff valve 162 may prevent any flow of the fuel from the metering valve 140 to the fuel manifold 72.

Here, the shutoff valve 162 is configured as an on-or-off/open-or-closed type of valve. This shutoff valve 162 is also configured as a flow divider which facilitates the flow of the purge fluid from the purge fluid control valve 166 to the fuel manifold 72 when the shutoff valve 162 is closed. With this arrangement, the purge system 80 is configured to flow its purge fluid through a downstream portion of the fuel system 28 and thereby purge any remaining fuel from that downstream portion of the fuel system 28 when the shutoff valve 162 shuts off the flow of the fuel to the fuel manifold 72. Of course, in other embodiments, it is contemplated the shutoff valve 162 and flow divider functionalities may be performed by discrete devices.

The fuel distribution system 78 may operate in various modes of operation. These operating modes may include a startup operating mode and a post-startup operating mode (or modes). During the startup operating mode, the fuel system 28 and its fuel distribution system 78 are operated to facilitate startup of the turbine engine 26 of FIG. 1. For example, prior to turbine engine operation, the turbine engine 26 may not generate any of the heat energy used for cracking the ammonia gas into the hydrogen gas and the nitrogen gas. Moreover, during the initial startup of the turbine engine 26, the turbine engine 26 may not generate enough of the heat energy for cracking the ammonia gas into the hydrogen gas and the nitrogen gas. Therefore, during the startup operating mode, the fuel system 28 and its fuel distribution system 78 are operated to deliver the hydrogen gas from the second fuel source 76 to the turbine engine 26. The first control valve 136, for example, may be closed and the second control valve 138 may be opened. By contrast, during normal steady-state and/or transient-state operation of the turbine engine 26, the turbine engine 26 may generate enough of the heat energy to facilitate the cracking of the ammonia gas into the hydrogen gas and the nitrogen gas. Therefore, during the post-startup operating mode, the fuel system 28 and its fuel distribution system 78 are operated to deliver the hydrogen gas and the nitrogen gas from the first fuel source 74 to the turbine engine 26. The first control valve 136, for example, may be opened and the second control valve 138 may be closed. During this post-startup operating mode, some of the separated hydrogen gas may also be delivered to the second fuel source 76 to recharge (e.g., resupply) the hydrogen gas.

The fuel system 28 may be configured with various types of internal combustion engines. The fuel system 28, for example, may be configured with a gas turbine engine as described above. While the turbine engine 26 is described above with two rotating structures (e.g., two spools), it is contemplated the turbine engine 26 may alternatively be configured with a single rotating structure or more than two rotating structures. Moreover, it is contemplated the fuel system 28 may alternatively be configured with various other types of internal combustion engines such as, but not limited to, a rotary engine (e.g., a Wankel engine), a reciprocating piston engine, etc. The present disclosure therefore is not limited to any particular type of internal combustion engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant, comprising:
   a turbine engine including a flowpath, a compressor section, a combustor section and a turbine section, the flowpath extending through the compressor section, the combustor section and the turbine section from an inlet into the flowpath to an exhaust from the flowpath; and
   a fuel system configured to deliver at least one of a first fuel or a second fuel to the combustor section, the fuel system including a first fuel source, a second fuel source, a first control valve, a second control valve, a metering valve and a fuel injector disposed within the combustor section;
   the first fuel source configured to crack ammonia into hydrogen gas and nitrogen gas and subsequently output the first fuel, wherein the first fuel comprises the hydrogen gas or a combination of the hydrogen gas and the nitrogen gas;
   the second fuel source configured to output the second fuel, wherein the second fuel comprises additional hydrogen gas;
   the metering valve configured to meter a flow of the first fuel received from the first fuel source through the first control valve to the fuel injector during a first operating mode, and the metering valve configured to meter a flow of the second fuel received from the second fuel source through the second control valve to the fuel injector during a second operating mode;
   a shutoff valve fluidly coupled inline between the metering valve and the fuel injector, the shutoff valve having an open position and a closed position;
   a flowmeter fluidly coupled inline between the metering valve and the shutoff valve, and the flowmeter configured to output flow data;
   a compressor fluidly coupled to the metering valve and being controlled to at least one of compress the first fuel during the first operating mode or compress the second fuel during the second operating mode, based on the flow data, wherein an inlet into the compressor is fluidly coupled to the metering valve downstream of a metering valve outlet, and an outlet from the compressor is fluidly coupled to the metering valve upstream of a metering valve inlet; and
   a purge system configured to purge at least one of the first fuel and the second fuel out of the fuel system downstream of the shutoff valve in the closed position.

2. The powerplant of claim 1, wherein the first control valve is configured to fluidly couple the first fuel source to the metering valve during the first operating mode, and the first control valve is configured to fluidly decouple the first fuel source from the metering valve during the second operating mode.

3. The powerplant of claim 1, wherein the second control valve is configured to fluidly couple the second fuel source to the metering valve during the second operating mode, and the second control valve is configured to fluidly decouple the second fuel source from the metering valve during the first operating mode.

4. The powerplant of claim 1, wherein the first fuel source is directly fluidly decoupled from the second fuel source upstream of the metering valve.

5. The powerplant of claim 1, wherein the second fuel source is configured as a second-fuel tank.

6. The powerplant of claim 5, wherein the first fuel comprises the hydrogen gas, and wherein the first fuel source is further configured to output the first fuel for filling the second fuel tank during the first operating mode.

7. The powerplant of claim 1, wherein the first fuel source is further configured to receive heat energy generated by operation of the turbine engine and heat the ammonia using the heat energy to activate a cracking cycle of the ammonia into the hydrogen gas and the nitrogen gas.

8. The powerplant of claim 1, wherein the first operating mode corresponds to post-startup operation of the turbine engine.

9. The powerplant of claim 1, wherein the second operating mode corresponds to initial startup of the turbine engine.

10. The powerplant of claim 1, wherein the first fuel consists essentially of the hydrogen gas.

11. The powerplant of claim 1, wherein the first fuel consists essentially of the combination of the hydrogen gas and the nitrogen gas.

12. The powerplant of claim 1, wherein the second fuel consists essentially of the additional hydrogen gas.

13. The powerplant of claim 1, wherein the shutoff valve is configured as a flow divider.

14. The powerplant of claim 13, wherein the purge system comprises a purge fluid reservoir and a purge fluid control valve, and wherein the purge fluid control valve is fluidly coupled inline between the purge fluid reservoir and the shutoff valve.

15. A powerplant, comprising:

an aircraft engine; and a fuel system configured to deliver at least one of a first fuel or a second fuel to the aircraft engine for combustion, the fuel system including a first fuel source, a second fuel source, a first control valve, a second control valve and a metering valve;

the first fuel source configured to crack ammonia into hydrogen gas and nitrogen gas, and the first fuel source configured to output the hydrogen gas or a combination of the hydrogen gas and the nitrogen gas as the first fuel;

the second fuel source configured to output additional hydrogen gas as the second fuel;

the metering valve configured to meter a flow of the first fuel received from the first fuel source through the first control valve directed into the aircraft engine during a first operating mode, and the metering valve configured to meter a flow of the second fuel received from the second fuel source through the second control valve directed into the aircraft engine during a second operating mode;

a shutoff valve fluidly coupled inline between the metering valve and the aircraft engine, the shutoff valve having an open position and a closed position;

a flowmeter fluidly coupled inline between the metering valve and the shutoff valve, and the flowmeter configured to output flow data;

a compressor fluidly coupled to the metering valve and being controlled to at least one of compress the first fuel during the first operating mode or compress the second fuel during the second operating mode, based on the flow data, wherein an inlet into the compressor is fluidly coupled to the metering valve downstream of a metering valve outlet, and an outlet from the compressor is fluidly coupled to the metering valve upstream of a metering valve inlet; and a purge system configured to purge at least one of the first fuel and the second fuel downstream of the shutoff valve in the closed position.

16. The powerplant of claim 15, wherein the aircraft engine is operating in a steady-state during the first operating mode; and the aircraft engine is starting up in during the second operating mode.

17. A powerplant, comprising:

an aircraft engine; and a fuel system configured to deliver at least one of a first fuel or a second fuel to the aircraft engine for combustion, the fuel system including a first fuel source, a second fuel source, a metering valve and a compressor;

the first fuel source configured to crack ammonia into hydrogen gas and nitrogen gas, and the first fuel source configured to output the hydrogen gas or a combination of the hydrogen gas and the nitrogen gas as the first fuel;

the second fuel source configured to output additional hydrogen gas as the second fuel;

the metering valve configured to meter a flow of the first fuel received from the first fuel source directed into the aircraft engine during a first operating mode, and the metering valve configured to meter a flow of the second fuel received from the second fuel source directed into the aircraft engine during a second operating mode;

the compressor configured to at least one of compress the first fuel during the first operating mode or compress the second fuel during the second operating mode, an inlet into the compressor is fluidly coupled to the metering valve downstream of the metering valve, and an outlet from the compressor is fluidly coupled to the metering valve upstream of the metering valve;

a shutoff valve fluidly coupled inline between the metering valve and the aircraft engine, the shutoff valve having an open position and a closed position;

a flowmeter fluidly coupled inline between the metering valve and the shutoff valve, the flowmeter configured to output flow data, wherein the compression of at least one of the first fuel during the first operating mode or the second fuel during the second operating mode at the compressor is controlled based on the flow data; and a purge system configured to purge at least one of the first fuel and the second fuel downstream of the shutoff valve in the closed position.

* * * * *